April 29, 1952     S. W. WOODARD     2,594,702
RETRIEVABLE MARINE MARKER
Filed Aug. 30, 1948     4 Sheets-Sheet 1

Inventor
Stanley W. Woodard
Lester B. Clark
& Ray L. Smith
ATTORNEYS.

April 29, 1952  S. W. WOODARD  2,594,702
RETRIEVABLE MARINE MARKER
Filed Aug. 30, 1948

Inventor
Stanley W. Woodard

By Lester B. Clark
Ray L. Smith
ATTORNEYS

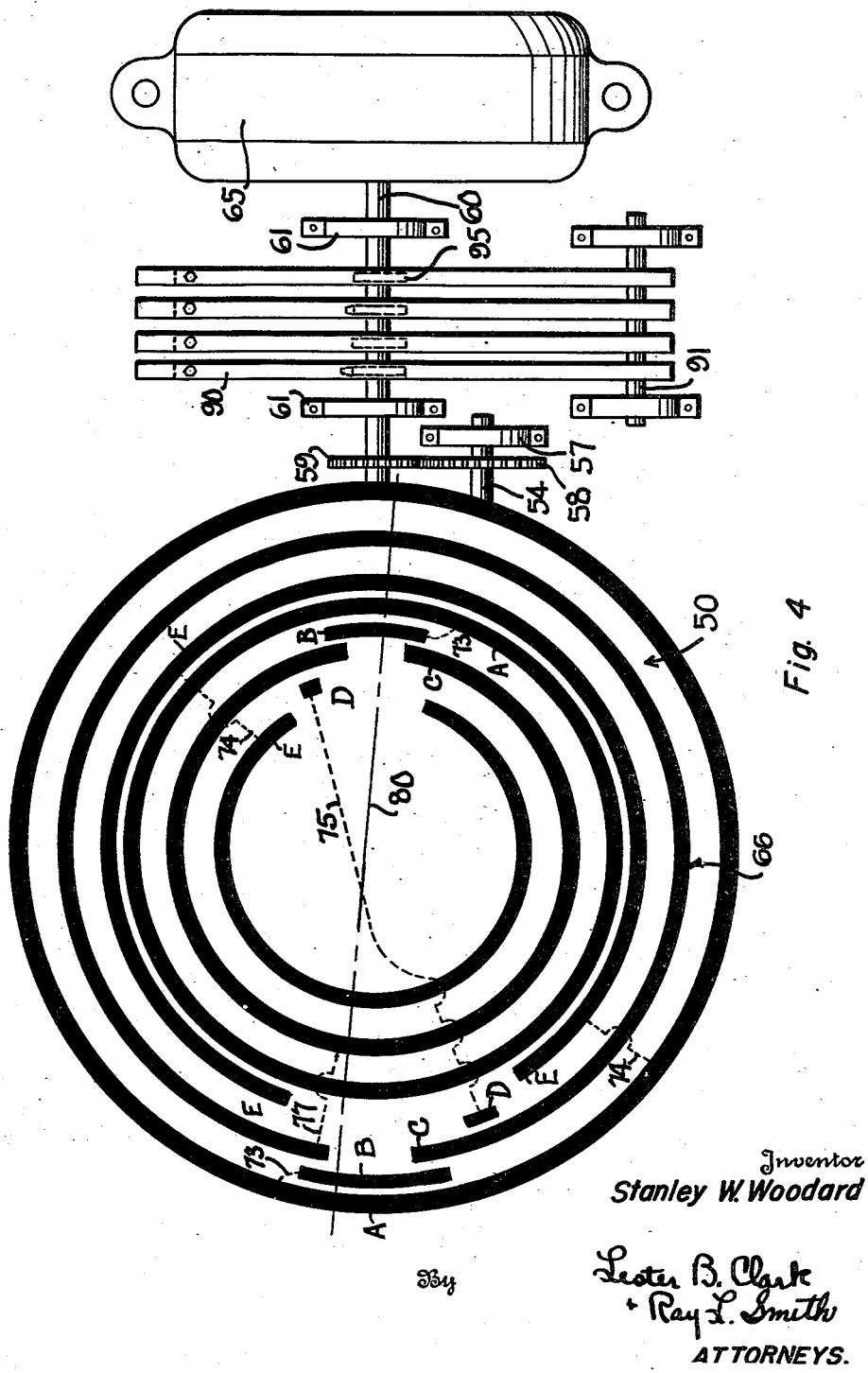

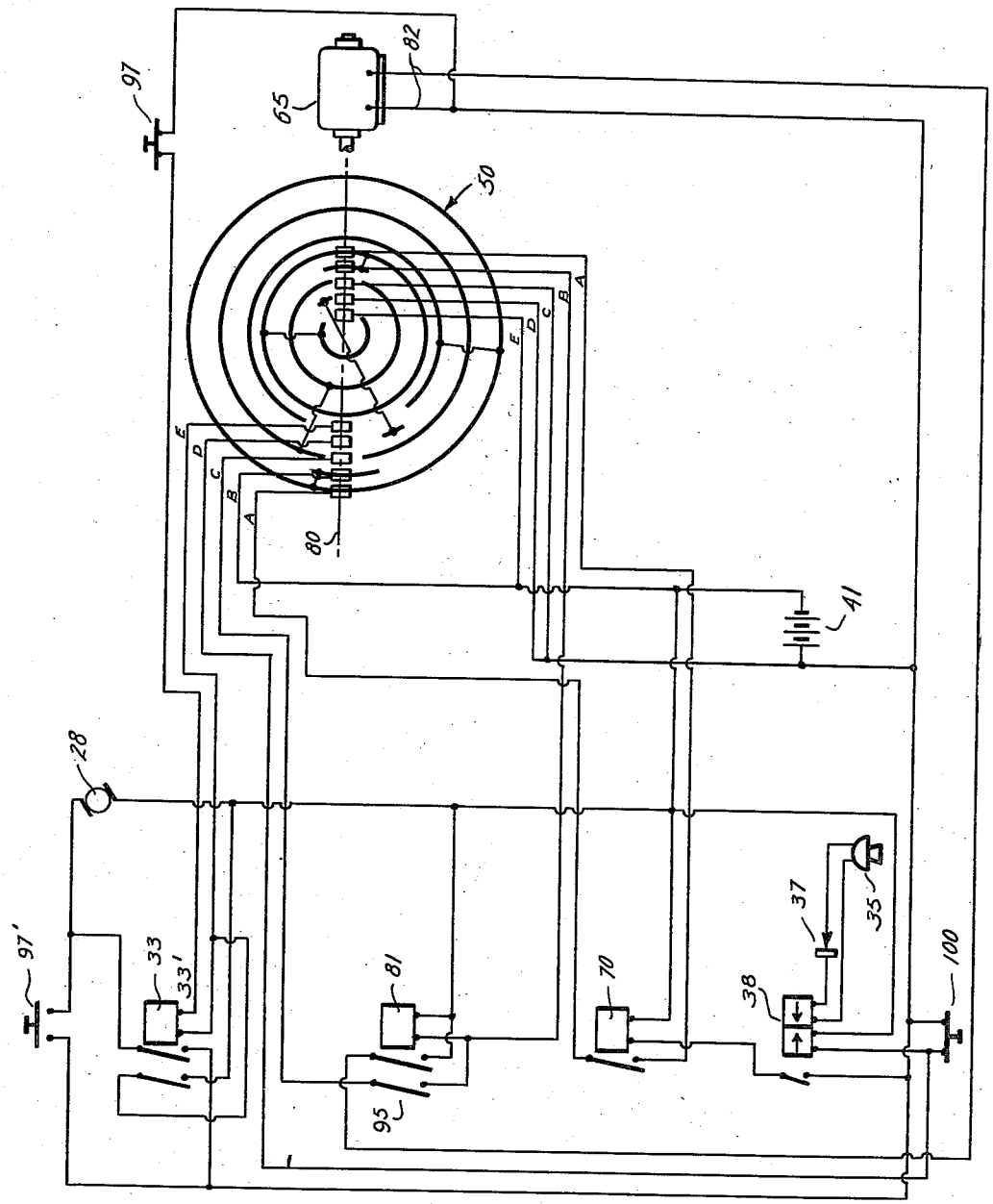

Patented Apr. 29, 1952

2,594,702

UNITED STATES PATENT OFFICE 2,594,702

RETRIEVABLE MARINE MARKER

Stanley W. Woodard, Houston, Tex., assignor to Dale Service Corp., Houston, Tex., a corporation of California Application August 30, 1948, Serial No. 46,807

1 Claim. (Cl. 177—385)

The invention relates to a marine marker capable of transmitting detectable signals so as to locate the marker after it has been submerged on a water covered area in combination with a releasable float or signal by which visual detection of the marker may be effected.

This invention particularly relates to markers which may be deposited upon submerged areas so as to transmit signals in order that the marker may be utilized as a location from which other operations may be conducted and so that the signals from the marker may be utilized in carrying on other affiliated operations.

The invention relates generally to the subject matter of my prior co-pending application, Serial Number 36,552, for a Marine Marker, filed July 1, 1948, now abandoned.

It is one of the objects of the invention to provide a submergible housing which carries suitable signal conducting mechanism whose operation may be initiated by an explosion or a series thereof.

Another object of the invention is to provide a submergible housing carrying suitable signal transmitting mechanism in combination with or independently of a releasable signal float both of which may be operable by an explosion or the creation of a suitable energizing force in an area approximating such housing.

Still another object of the invention is to provide an arrangement of electrical circuits sensitive to either a suitable potential or to one or more seismic explosions so as to initiate and transmit detectable signals whereby the position of the marker may be located.

Still another object of the invention is to provide an arrangement of electrical circuits sensitive to a seismic explosion or a code series of explosions so as to initiate and transmit detectable signals whereby the marker may be located, in combination with a releasable captive float signal so that the marker may be positively located by observing such float.

Another object is to provide a submergible signal and/or a detecting mechanism therefore which may be intentionally submerged to transmit signals for its subsequent detection and location by a telltale buoy and which may be also disposed upon a ship or barge to permit location thereof in event of sinking.

Another object is to provide a system and mechanism for release of a signal buoy of a suitable type to permit detection of the location of the mechanism in a water covered area.

It is also an object to provide a code involving various combinations of intentionally transmitted signals to initiate the operation of a submerged marker and signal mechanism so as to prevent unauthorized or interfering operation thereof.

It is also an object to initiate the operation of a submerged marker signal by the proximate positioning of electrodes or other means of producing a potential or other source of energy transmittal thru the water when such marker is submerged.

A still further object of the invention is to provide a combination of interrelated electrical circuits whereby a seismic wave effects an actuation of signal from a submerged marker either alone or in combination with the release of a visual float signal whereby the marker may be located in conducting over-water surveys and affiliated operations.

Other and further objects of the invention will be readily apparent when the following description is considered in connection with the accompanying drawings wherein:

Fig. 4 is a side elevation looking toward the left of Fig. 3.

Fig. 5 is a schematic drawing of the electrical control circuit.

Figure 1:
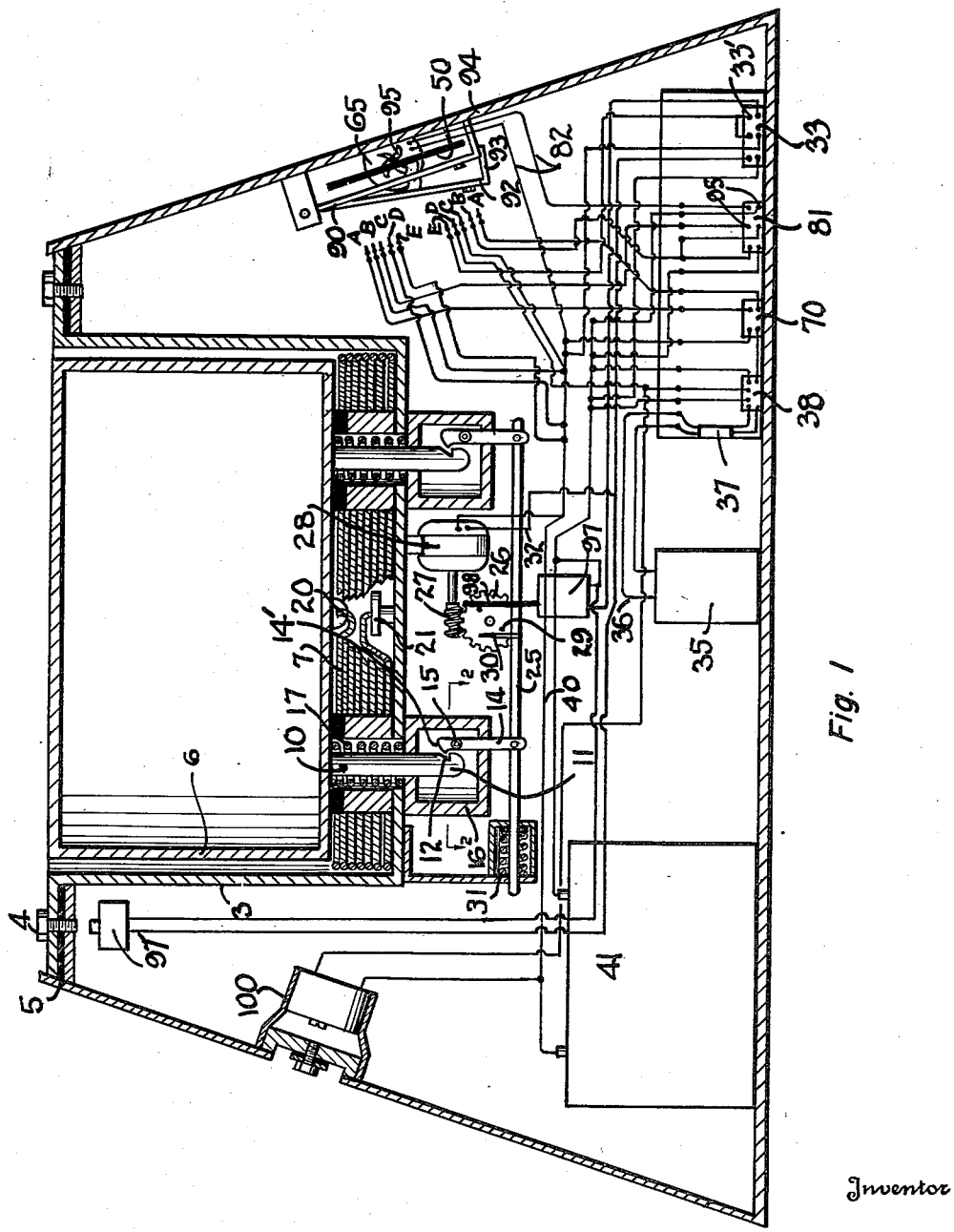
Fig. 1 is a transverse sectional view through the marker housing and illustrating a wiring diagram of the signaling mechanism and the float release.

The marker is embodied in the form shown in Fig. 1 wherein the housing 1 has a base 2 which is arranged to rest upon the water bottom. The housing 1 is arranged with a recessed well 3 affixed to the housing by the bolts 4 and sealing gasket 5 so as to provide a water-tight joint to exclude moisture from the interior of the housing where the operating mechanism has been locked.

As heretofore indicated the marker relates to a signaling type of device as generally set forth in my prior application but specifically includes the improvement of a tell-tale buoy float or visual signal which can be released from the marker while the marker is submerged so that such captive buoy will rise to the surface where it can be observed.

Fig. 1 shows the buoy 6 in the form of a hollow vessel of any suitable material which will have sufficient buoyancy to promptly rise to the surface of the water and carry the cable 7 therewith. Such a buoy could be collapsible and subject to automatic inflation upon release. If desired the buoy 6 might be forcibly discharged because the housing might be embedded in mud or muck. The buoy might carry a radio transmitter which would broadcast a signal to aid in its location.

The buoy 6 is retained within the well 3 by the latching mechanism 10. This latch may take various forms but is illustrated as embodying the latch rods or prongs 11 having a notch 12 therein to receive the retainer lever 14 which is fixed on a rock shaft 15 to one side of the latch box 16 so that rocking movement of such lever will rock the finger 14' to release the latch prongs. The buoy and prongs are urged upwardly by a coil spring 17 loosely disposed beneath the buoy in the well 3. The well may carry a grease to prevent leakage of water into the housing 1 after the buoy has been released.

One end of the cable 7 is anchored at 20 to the buoy while the other end is anchored at 21 to the marker housing at the base of the well 3. A suitable length of cable may be used to permit the buoy to reach the surface of the water in which the marker housing has been submerged.

The releasing lever 14 of the latching is fixed on the rock shaft 15. The releasing mechanism 10 will be operated by the transverse movement of the rod 25, Fig. 2, which is adapted to be moved laterally when the worm wheel 26 is turned by the worm 27 and the motor 28. Such rotation causes a pin 29 on the worm wheel 26 to engage the extension 30 on the rod 25 so as to move the rod to the left as seen in Fig. 1. Such movement rocks the latch levers 14 and fingers 14' and releases the prongs 11 so that the springs 17 may forceably discharge the buoy 6. A coil spring 31 carried by the base of the well normally urges the rod 25 to the right so as to retain the levers 14 latched to the rods 11.

Figure 2:
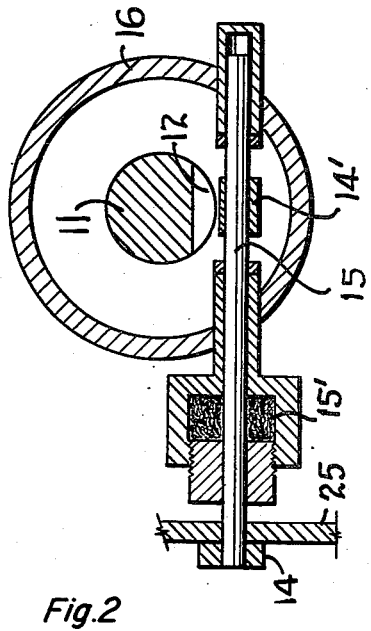
Fig. 2 is a sectional view taken in the line 2—2 of Fig. 1, showing the releasing mechanism for the float signal, or buoy.

The section view of Fig. 2 shows the latch box 16 carries a bearing closed to the outside of the box to support one end of the rock shaft 15 and a packing 15' to seal the other end. This arrangement prevents leakage into the housing upon release of the buoy.

An electrical circuit 32 for the electric motor 28 is connected into the left hand contact of a release control relay 33 carried by the base of the housing 1. It seems obvious that when this relay 33 is actuated to energize the motor 28 for a predetermined amount of rotation of the gear 26 that operation of the motor will release the buoy. As the gear 26 rotates it will move the arm 30 to the left in Fig. 1 at which time the buoy is released. A second pin 29 on the gear 26 strikes a switch arm 98 of the switch 97 to open the coil circuit of the relay 33 which stops the motor 28. In order that the switch 97 may be reset when the buoy is to be replaced a normally open push button switch 97' may be positioned under a bolt 4 so that the motor 28 may be again operated to reset the latch mechanism and the circuit 32 will again be available to release the buoy.

A retainer for the rod 25 is provided to hold the latch mechanism 10 so as to insure that there will be no inadvertent release unless the motor 28 is operated.

The relay 33 is a double pole single throw relay in which one of the contacts is connected to the motor circuit 32.

The gear 26, worm 27, and pins 29 could be replaced with a cam arrangement.

Broadly, it is contemplated that any suitable signal received by the device will serve to actuate this buoy release control relay to close this circuit 32 and release the buoy.

The leads 40 go from the battery 41 which is a source of power, to a series of terminals for all the various circuits.

For purposes of one form of illustration herein it will be explained that a geophone 35 will be disposed in the housing and is capable of receiving a seismic wave which may result from an explosion in the general vicinity of the marker. The construction and operation of geophones are well known in the art and need not be explained here except to point out that the alternating current from such geophone through a circuit 36 leads into a rectifier 37 where it is converted into a direct current and carried on to the coil of a sensitive magnetic contact relay 38. Of course other devices to set up such a potential may be used in lieu of the geophone.

In order to energize a plurality of different circuits in the desired sequence and to transmit the desired signals from the marker for purposes of location of the marker and to transmit information which may be correlatable with other data, a switch plate 50 has been shown diagrammatically as being attached to and supported by the housing 1 from a base 51. The various circuits controlled or timed by this switch plate 50 are seen in Fig. 1 and the actual construction and arrangement of such plate is shown in Figs. 3 and 4.

The plate is mounted on a shaft 52 which carries a worm wheel 53 driven by a worm shaft 54. This shaft is supported by the bearings 57 of Fig. 3 and carries a gear 58 which meshes with a gear 59 on the motor shaft 60. This motor shaft is mounted in the bearings 61 and is driven by the motor 65.

Figure 3:
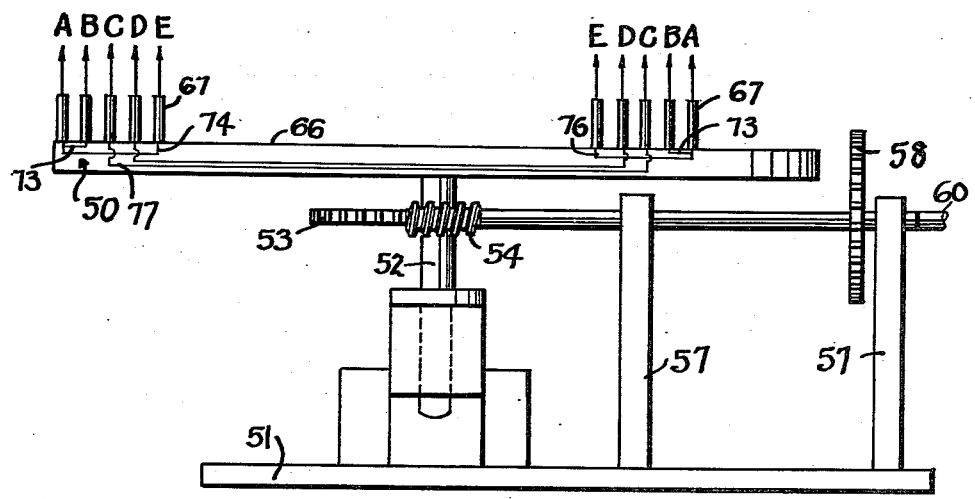
Fig. 3 is an edge elevation of the switch, or collector plate, which controls the electric signal and operating circuits.

With this arrangement the motor 65 will drive the switch plate 50 at a desired speed so that the collector rings 66, a plurality of which are shown in Fig. 4, on the collector plate 50, will move into an out-of-contact with the series of brushes 67 which ride on such rings as seen in Fig. 3.

The collector rings A, B, C, D, and E have been shown in Fig. 4 while the complementary brushes therefor, A, B, C, D and E, are shown in Fig. 3.

By comparing Figures 1, 3, and 4 it will be observed that the various circuits are arranged to be opened and closed as follows for purposes of operation of the mechanism.

The brushes AA of Fig. 3 are arranged to contact the collector rings AA of Fig. 4 and this circuit AA has its terminals A connected to the contact of the power relay 70.

The collector rings A of the plate 50 have two electrical connections 73 leading to the two segments of the collector rings B and electrical connections 74 leading to the collector rings E as also seen in Fig. 4.

The collector rings CC are connected electrically together by the lead 77. The rings DD in the form of two short segments are connected at 75.

In order to explain these circuits it may be assumed that at the time the switch plate is energized the brushes A to E inclusive will be disposed along the diameter 80 as seen in Fig. 4.

When the geophone 35 described above is energized, the contact of starting relay 38 is closed. The consequent closing of the contact of the relay 38 energizes the coil of the power relay 70. This in turn closes the contact of the power relay 70 to close the circuit through the rings AA. When the brushes are along the diameter 80, the rings BB are in series with the rings AA and the circuit to the coil of the signal relay 81 is thus energized which causes the contacts of this relay to close. This relay is a double pole single throw relay and one of the contacts closes the circuit 82 to the signal motor 65 which operates the motor shaft 60 as seen in Fig. 4.

Arranged to be actuated by the motor shaft 60 are a plurality of striker arms 90 pivoted on the shaft 91. Each of these strikers is in the form of an arm 92 having a striker portion 93 to engage the sounding body 94 which is a part of the housing. These strikers will be elevated by different shaped cams 95, one of which is arranged on the shaft 60 for each of the striker arms 90. This mechanism is more fully disclosed in my above mentioned co-pending application and may be arranged to a different sequence or tone so that by arrangement of the strikers and cams predetermined desired signals may be transmitted. This operation of the motor 65 continues to turn the switch plate 50 so as to open and close the several circuits.

The direction of rotation of the switch plate 50 as seen in Fig. 4 would be in a clockwise direction.

Another contact 95 of the signal control relay 81 is in series with the coil of this relay 81 and the battery leads 40 through the rings C. Thus, as the plate rotates the coil of the relay 81 is first energized through the energizing of the relay 38. As the plate continues to rotate the circuit energizing this coil of the relay 81 is also closed through one set of contacts of the relay 81 through the circuit CC.

As the plate continues to rotate the circuit through BB is opened as the segments BB travel beyond the brushes BB. However the coil of relay 81 continues to be energized by the circuit C, thus keeping the relay 81 closed. As the plate continues its rotation the segments of the rings DD come into contact with the brushes DD to close the circuit which resets the magnetic contact of the sensitive relay 38.

This contact opens both the relays 38 and 70. As the segments of the collector rings DD move beyond the brushes DD, the reset circuit is opened and the relays 38 and 70 are free to be activated by another impulse from the geophone 35.

Further continued rotation of the plate 50 moves the contact of the relay 70 into series with the coil 33' of the relay 33 through the circuits AA and EE.

This arrangement continues until the plate has nearly completed one turn or revolution and the collector ring segments EE have passed the brushes EE to open the E circuit. As the plate continues the B segments again come under the B brushes while the C brushes are still in contact with the C rings. The plate stops rotating when the C segments go past the C brushes and the circuit 82 of the signal motor 65 is opened.

If during the rotation of the switch plate, the geophone 35 has not been energized while the E circuit is in series with the contact of the relay 70, the motor 28 does not operate and there will be no release of the buoy. If, however, geophone 35 has been energized during this time, the relay 33 is operated by means of the relays 38 and 70 and the motor 28 operates to release the buoy 6.

To summarize the above explanation, if an explosion has energized the geophone 35 to activate the mechanism but no further explosions nor subsequent seismic waves have been picked up by the geophone during the time that the switch plate was making one revolution, then the following sequence of events takes place.

First, the relay 38 is energized to close the relay 70 which in turn closes the relay 81 to close the circuit 82 to operate the motor 65. This motor operates the strikers 90 to give a sound signal and to also turn the switch plate 50.

Second, the coil circuit of the relay 81 is closed through one of the contacts of the relay 81 while next the contact of the relay 70 is disconnected from the coil circuit of 81; the reset circuit of the relay 38 is closed to open the contact of this relay which in turn causes the relay 70 to open. Next, the reset circuit of relay 38 is opened and this relay is now ready to be energized by the geophone 35. The contact of the sensitive relay 33 is always in series with the coil of the power relay 70.

Next, the contact of power relay 70 is put in series with the coil of release relay 33. This arrangement remains throughout most of the rotation of the switch plate. When the switch plate has nearly completed one revolution the contact of power relay 70 is disconnected from the coil circuit of relay 33. Next, the contact of relay 70 is connected in series with the coil circuit of relay 81. Finally, the circuit 82 is opened when the rings CC go past the brushes CC and the motor 65 stops with the brushes AA through EE positioned on the plate diameter 80.

The process is repeated when another explosion energizes the geophone 35. If a second explosion occurs after the reset circuit for the relay 38 has been closed and opened and while the circuit through the ring segments EE is closed, the sequence of events changes as follows:

When the second explosion occurs to energize the relay 38 which in turn energizes the relay 70, the closing of relay 70 energizes through the circuit E, the coil of relay 33 which is a double pole single throw relay. One contact of the relay 33 closes to operate the motor 28 which turns the gear 26 and causes the pin 29 to bear against the surface 30. This pushes the arm 98 which in turn moves the lever arms 14 to release the fingers 14' from the prongs 11 so that the buoy 6 may rise to the surface of the water to be discharged from the housing to be held captive by the cable 7. If it is desired the entire marker may be retrieved by raising on the cable 7; any suitable mechanism for retrieving the marker housing could be used in cooperation with the cable 7. For example, an overshot may be run along the cable to clamp over the shoulder of the pin 21.

The other contact of the relay 33 is connected in series with the coil circuit of the relay 33.

With this arrangement once the relay 33 has been energized by the circuit E it will remain energized even if the circuit E has been disconnected from the coil circuit. The energized circuit will remain closed until the switch 97 has been opened. If desired the switch 97 may be positioned so that one of the pins 29 will open the switch when the displacement of the pin 30 has been moved a maximum distance to the left in Fig. 1. Thus the motor 28 will now stop to retain the latches 15 in the unlatched position. When the buoy is unlocked the springs 17 impart an upward thrust to the buoy so as to insure its release from the marker.

The plate 50 continues to rotate after the buoy release mechanism has been energized for the purpose of producing the following sequence:

Since the sensitive relay 38 has not been reset from the second explosion the first steps here described will be repeated.

After the buoy has been released the switches may be caused to continue to operate by again energizing the geophones 35.

There is a time interval provided for in the operation in this manner which can be determined during the time the signal is accruing in which the buoy can be released by another explosion or if it is not desired that the buoy be released of course the marker will be transmitting the detectable signals from the strikers 90.

In operation the marker will be activated by the first explosion and then if a second explosion occurs during a predetermined time interval while the first signal is being transmitted release of the buoy will occur.

If desired, by using only the relay 81 and connecting it to operate the release mechanism, eliminating the strikers 90 and the switch plate 50 a release for the buoy may be accomplished. Such an operation could be useful as a retrieving device by attaching the same to any article which may have to be retrieved from a submerged area at a later time.

On the other hand, if the buoy release remains inactive a marine marker is provided which can be located due to the transmission of a signal which is initiated by an explosion.

Fig. 1 shows a delay device 100 connected into the sensitive relay 38 which may be used to cause a delay of any desired time in the initiation of the operation of the marker. A dash pot construction or other form may be utilized.

It seems obvious that various combinations of the two devices might be useful wherein the buoy could be released upon the occurrence of the first explosion while the striker signals were operated continuously from the time the buoy is released until such time as the marker is retrieved. Also the buoy could be used in conjunction with my co-pending application mentioned herein by which a marker producing a signal at predetermined time intervals would have a captive buoy which could be caused to rise to the surface when desired for purposes of locating or recovering the marker. The geophone 35 might be replaced by other devices, such as, for example, a two-conductor cable extending outside the housing and where each conductor terminates at an electrode outside the marker. The electrodes are spaced a suitable distance apart and they may be caused to have sufficient difference in electrical potential to operate the relay 38 by the passage of adequate electrical current between two other electrodes in the water which are in the vicinity of these electrodes. The two current electrodes might be dragged through the water by a boat in the vicinity of the markers to effect release of the buoy. Also the geophone 35 might be replaced by a device which is sensitive to underwater sound of a predetermined frequency such as, for example, a Fessenden oscillator. In this case the buoy could be released when an underwater sound generator is operated at the desired frequency in the vicinity of the marker.

It might be desired to have a delay between the time an explosion occurs and the time the signal from the marker starts. In this case the contact of relay 81 which is used to close the circuit 82 would be used instead to operate a time delay relay, which in turn would close the circuit 82 at a later time. Such relays are well known and need no description here.

The marker described herein requires one explosion to start the signal and a second explosion in a predetermined time interval thereafter in order to release the buoy. However it should be pointed out that by adding the appropriate rings to the switch plate relays and the corresponding electrical circuits, any desired number of explosions may be required to start the signal or to release the buoy. In other words, if desired, the signals required for operating the marker could be coded for both the number of explosions and the time sequence of the explosions. In this case, if the signal were to be given on some explosion other than the first one, the motor 65 would be used to operate the switch plate only. The first explosion would set the switch plate into operation in the same manner as illustrated above. The second explosion would operate relay 33, which, instead of operating the motor 28 would close a contact in an interlocking electrical circuit. By following the same procedure for additional relays the explosions required to start the signal or to release the buoy can be set at any desired number. Also, the time sequence required for the explosions can be adjusted in the desired way by changing the corresponding rings on the switch plate.

What is claimed is:

A self-contained submersible marine marker comprising a housing, a float detachably connected with the housing, a cable connected to said housing and to the float, a float latching means to hold said float releasably to the housing, motor driven means in said housing to produce a succession of sound signals arranged in a pattern to identify the marker, a geophone in said housing responsive to a short seismic impulse received by the housing, means operated by the geophone upon responding for closing a circuit to the motor of the motor driven means, switch means operated by the motor for maintaining it in operation for a predetermined time independent of the geophone circuit closing means, electromechanical means for releasing said latch means, other switch means operated by the motor during its maintained operation for preparing a circuit to the releasing means and means whereby said geophone when operated by a seismic impulse during the maintaining period completes said releasing means circuit.

STANLEY W. WOODARD.

REFERENCES CITED

The following references are of record in the file of this patent:

UNITED STATES PATENTS

| Number | Name | Date |
| --- | --- | --- |
| 736,432 | Owens | Aug. 18, 1903 |
| 1,292,755 | Geraghty | Jan. 28, 1919 |
| 1,310,568 | Heap et al. | July 22, 1919 |
| 1,610,779 | Hewett | Dec. 14, 1926 |
| 2,170,000 | Eggleston | Aug. 22, 1939 |
| 2,401,955 | Olson | June 11, 1946 |
| 2,431,018 | Bailey et al. | Nov. 18, 1947 |
| 2,447,069 | Holcomb | Aug. 17, 1948 |